Oct. 8, 1940.  B. A. DIGGORY ET AL  2,217,334
SCREEN FOR ELECTRO-OPTICAL DEVICE AND METHOD OF PREPARING IT
Filed Dec. 30, 1937  2 Sheets-Sheet 1
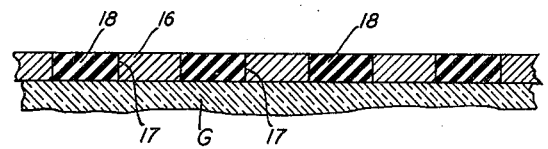
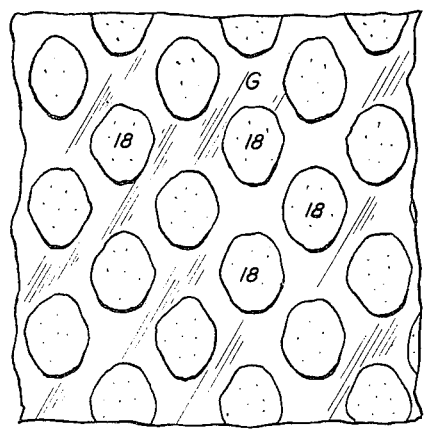
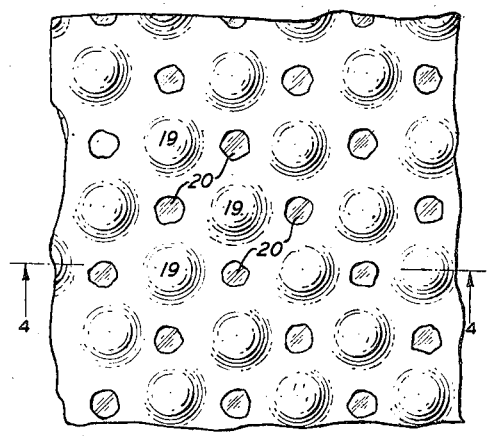
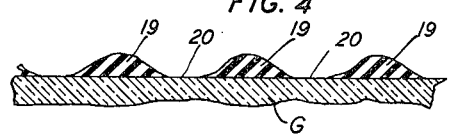
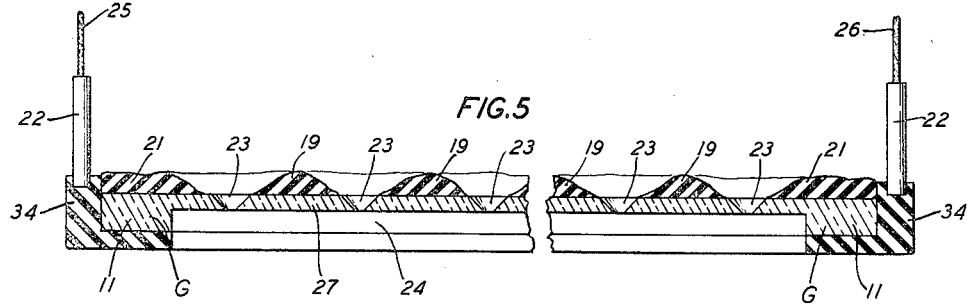
INVENTORS: B. A. DIGGORY
G. K. TEAL
BY
ATTORNEY Oct. 8, 1940.   B. A. DIGGORY ET AL   2,217,334
SCREEN FOR ELECTRO-OPTICAL DEVICE AND METHOD OF PREPARING IT
Filed Dec. 30, 1937   2 Sheets-Sheet 2
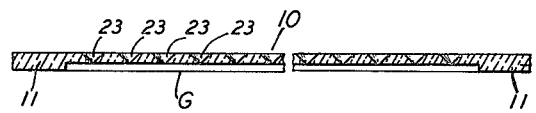
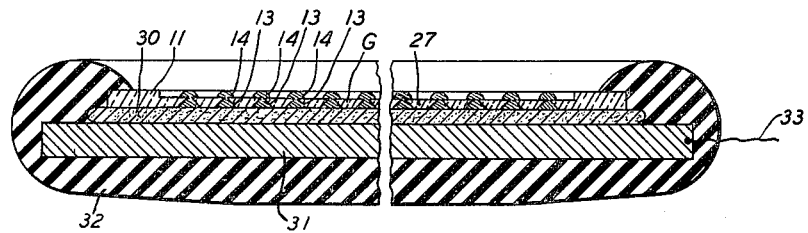
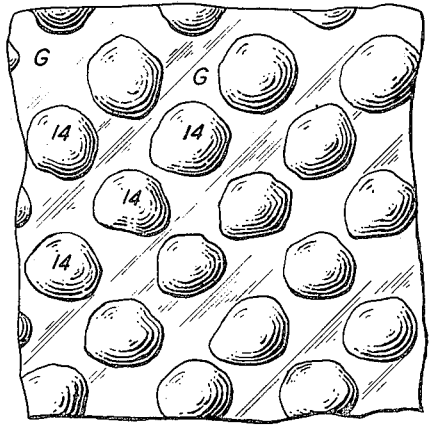
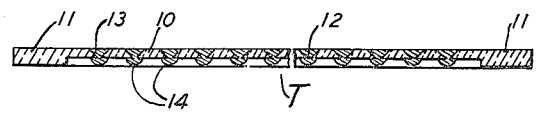
INVENTORS: B. A. DIGGORY
G. K. TEAL
BY
C. A. Sprague
ATTORNEY Patented Oct. 8, 1940

2,217,334

UNITED STATES PATENT OFFICE 2,217,334

SCREEN FOR ELECTRO-OPTICAL DEVICE AND METHOD OF PREPARING IT

Benjamin A. Diggory, Plainfield, N. J., and Gordon K. Teal, New York, N. Y., assignors to Bell Telephone Laboratories, Incorporated, New York, N. Y., a corporation of New York Application December 30, 1937, Serial No. 182,396

16 Claims. (Cl. 250—27.5)

This invention relates to electro-optical devices and more specifically to mosaic screen structures for use in television transmitter tubes and to methods of making these screen structures.

In a form of television camera tube heretofore devised, a cathode ray beam is adapted to impinge upon one surface of an insulating plate, the other surface of which is closely adjacent a photoemissive member. The insulating plate has a multiplicity of metallic elements therethrough. In the operation of this device, radiations from an object or field of view produce an emission of electrons toward the insulating plate where they cause the metallic elements thereof to have charges built-up thereon which are proportional to the light-tone values of the respective elemental areas of the object. These charges are driven to equilibrium by the passage of the scanning beam over the opposite ends of the metallic elements to produce an image current in an external circuit. Since there is a relatively small distance between the photoemissive screen and the insulating plate, the capacity and the stored charge are large.

It is an object of this invention to provide a novel insulating plate suitable for use in television transmitter tubes. It is another object of this invention to provide a novel method of forming such a plate.

In accordance with the invention, an insulating plate is provided for use in television transmitting tubes comprising a thin film of glass about .002 inch thick supported by a thicker border of glass, the thin center portion having therein a multiplicity of small holes regularly spaced and uniform in size. For one form of tube these holes are filled with locked-in metallic buttons.

This mosaic plate is preferably prepared by coating one surface of a glass plate with a plurality of wax dots through a mesh screen, removing the screen, melting the wax so that only small spaces of the plate between the dots are left uncovered, etching the plate with an etching solution until the acid almost etches through to the side which is not covered by the wax, etching from the other side until the acid etches through to the apertures, washing the plate, and then depositing metallic plugs in the apertures from a suitable metallic plating solution. Large heads are then put on the plugs to cause them to be locked in place.

The invention will be more readily understood from the following description taken in connection with the accompanying drawings forming a part thereof in which:

Figs. 1 to 8, inclusive, show various steps in the process of making an insulating plate suitable for use in television transmitting tubes; and Fig. 9 shows an insulating plate which has passed through the steps shown in Figs. 1 to 8, inclusive.

Referring more particularly to the drawings, Fig. 9 shows an insulating plate which is suitable for use in certain television transmitting tubes. This insulating plate or target T comprises preferably a thin film of glass 10 about .002 inch thick supported by a thicker border of glass 11, the thinner portion 10 having therethrough a multiplicity of frusto-conically shaped holes regularly spaced and uniform in size. These holes are filled with locked-in buttons 12 of any suitable metallic material such as, for example, copper or silver. Each locked-in button 12 comprises a frusto-conical portion 13 and a globular head portion 14. The successive steps in the preparation of the screen or target T will be easily understood by referring to Figs. 1 to 8, inclusive.

Referring to Fig. 1, G designates a thin piece of glass of the shape required for the screen (it may be square, rectangular or circular) and of a thickness of about .005 inch which is held against a metal screen 16, the perforations 17 of which are filled with a suitable substance 18 not affected by etching solutions. An appropriate material for this purpose is a mixture of beeswax and lanolin, which mixture is spread on the metal screen 16 and pressed evenly into the apertures 17 with a spatula. The excess wax is then scraped off, after which the metal screen 16 is very carefully pulled away from the glass plate leaving small spots of wax 18 regularly spaced on the glass G. Fig. 2 is a plan view of a section of the plate G showing the wax spots 18 thereon.

The glass plate G is then held above rising currents of hot air produced, for example, by conduction through a heater of several parallel resistance wires. Plate G is held with its waxed face downward so that the wax is heated more rapidly than the underlying glass. Heating of the surface is continued until the wax softens sufficiently for the wax spots to flow together to give a wax screen such as is shown in Figs. 3 and 4.

Referring now to Figs. 3 and 4, it will be clear that the wax spots 18 have been melted down to form small hillocks 19 and the wax has flowed along the surface of the glass plate G to such an extent that only small portions 20, each of which is evenly spaced between four of the hillocks 19, are free from wax. The plate is then ready for the etching process.

Referring now to Fig. 5, the borders 11 of the glass plate G are coated with a protective coating 34 of wax. Metal bands 22 are waxed onto the glass plate and supporting wires 25 and 26 are attached to these bands. Hydrofluoric acid is then poured on the waxed surface of the glass plate G and the glass is etched from the portions 20 of the plate not covered by the hillocks 19. When the indentations 23 made by this process are etched almost through to the opposite side of the glass, the hydrofluoric acid is removed and dilute sulphuric acid is put on the waxed surface. This is followed by a wash with concentrated sulphuric acid in order to remove the wax and to dissolve the insoluble precipitate of hydrofluosilicic acid which forms during the etching process and impedes the smoothness of the etch. After the precipitate is dissolved, the concentrated acid is replaced by dilute acid and the latter is then washed out with water. This procedure is required to avoid local heating of the glass which would result in breakage.

The glass is then washed with water and etching of the glass from the back side, that is the side opposite the waxed side, is carried on by floating the unit on the surface of the hydrofluoric acid solution to etch out the portion 24 from the glass G. The wire supports 25 and 26 are used to suspend the plate in the solution. This process is continued until the acid etches through to the indentations 23. If one-half of the unit etches through before the other, the unit is tilted so as to etch the other half more rapidly. When the indentations 23 are just etched through the entire surface of the glass plate G, that is, to the line 27, the blank is washed with water, the wax is entirely removed from the glass and the screen is given a finishing dip to etch the holes 23 to the desired size. The glass blank, after it has gone through the etching process, is shown in Fig. 6 which shows a glass plate G having a thin center portion 10 in which are a multiplicity of small frusto-conical holes 23, and a thicker border portion 11.

If the glass screen is to be used in certain types of television transmitter tubes, it is necessary that the holes 23 be filled with metal plugs in such a manner that the plugs will not come out. In order to accomplish this the following procedure is adopted. With reference to Fig. 7 a conducting mixture 30 of beeswax, lanolin and powdered graphite is spread smoothly on a heavy copper plate 31. The glass screen shown in Fig. 6 is then laid flat on the mixture as shown in Fig. 7 and enough heat is applied to make the wax in the mixture 30 wet the glass.

The glass screen is laid in such a position that the edge of the plate containing the bases of the frusto-conical holes 23 is against the wax graphite coating 30. The screen is held in position against the coating by means of a heavy wax covering 32 which surrounds the copper plate 31 and covers small portions of the borders 11.

Electrical connection is made to the copper plate 31 by means of the terminal 33 and the plate is immersed in a copper plating bath of the following composition: water 500 c. c., CuSO$_4$ 130 grams, H$_2$SO$_4$ 17 c. c. The anode of the bath is a copper plate (not shown). Copper plugs are thus deposited in the holes as indicated in Fig. 7. Large heads 14 are then put on the metal plugs by continuing the electrolytic process until they build up to the shape indicated in the drawings, Figs. 7 to 9, inclusive. These plugs are locked in the holes 23. The finished mosaic is then removed from the copper plate by dissolving the wax in hot carbon tetrachloride.

When it is desired to have silver plugs in the holes 23 it has been found convenient to first deposit copper plugs, as explained above, in the holes 23 and then dip the mosaic into a silver plating solution. Replacement of the copper plugs by silver takes place rapidly.

The final mosaic, as shown in Fig. 9, obtained by the above process is a plate having a highly asymmetrical conductance, since it is metallically conducting in the transverse direction and highly insulating in the lateral direction. A mosaic screen having 4225 holes per square inch produced by the above process has proven satisfactory in a television transmitter tube. It is to be understood, however, that screens of a greater number of holes per unit area can be made by this method and the invention is not limited to the use of this specific number of holes per unit area.

The process of obtaining apertures in glass plates may also be used to prepare screens which do not have metal plugs therethrough.

Various other modifications may be made in the invention as above described, the scope of which is indicated by the appended claims.

What is claimed is:

1. The method of making an insulating plate for an electron target having a multiplicity of apertures transversely therethrough which comprises the steps of coating certain portions of a plate of insulating material with a material which is unaffected by etching fluids, heating said plate so that only relatively small spots on the plate are not covered by the coating material and etching said coated plate with an etching solution to etch those portions of the plate not covered by the coating material.

2. The method of making an insulating plate for an electron target having a multiplicity of apertures transversely therethrough comprising the steps of coating a plate of insulating material with a material which is unaffected by an etching fluid in such a manner that a multiplicity of small spots on the plate are not covered by the coating material, etching said coated plate with an etching solution to etch those portions of the plate not covered by the coating material to a depth which is a fraction of the thickness of the plate and etching said coated plate again with an etching solution to etch out a considerable portion of the plate from the side of said plate not covered by the coating material so that said plate has a multiplicity of small frusto-conical shaped apertures therethrough.

3. The method of making a target for electrons which comprises the steps of etching a multiplicity of apertures in an insulating plate, separating said insulating plate from a copper plate by means of a coating of a conducting waxy mixture, and immersing said insulating plate and copper plate in a copper plating bath to deposit in said apertures plugs of copper.

4. The method of making a target for electrons comprising the steps of etching a multiplicity of apertures in an insulating plate, separating said insulating plate from a copper plate by means of a coating of a conducting waxy mixture, immersing said insulating plate and copper plate in a copper plating bath to deposit in said apertures plugs of copper, and dipping the insulating plate with the copper plugs therein in a silver plating solution to replace the copper plugs with silver.

5. The method of making a target for electrons comprising the steps of coating a plate of insulating material with a material which is unaffected by an etching fluid in such a manner that a multiplicity of small spots on the plate are not covered by the coating material, etching said coated plate with an etching solution to etch those portions of the plate not covered by the coating material to a depth which is a fraction of the thickness of the plate, etching said coated plate again with an etching solution to etch out a considerable portion of the plate from the side of said plate not covered by the coating material so that said plate has a multiplicity of small frusto-conically shaped apertures therethrough, separating the insulating plate from a copper plate by means of a coating of a conducting waxy mixture, and immersing said insulating plate and copper plate in a copper plating bath to deposit in said apertures plugs of copper.

6. The method of making a target for electrons comprising the steps of coating a plate of insulating material with a material which is unaffected by an etching fluid in such a manner that a multiplicity of small spots on the plate, at least 4000 per square inch, are not covered by the coating material, etching said coated plate with an etching solution to etch those portions of the plate not covered by the coating material to a depth which is a fraction of the thickness of the plate, etching said coated plate again with an etching solution to etch out a considerable portion of the plate from the side of said plate not covered by the coating material so that said plate has a multiplicity of small frusto-conically shaped apertures therethrough, separating the insulating plate from a copper plate by means of a coating of a conducting waxy mixture, immersing said insulating plate and copper plate in a copper plating bath to deposit in said apertures plugs of copper, and dipping the insulating plate with the copper plugs therein in a silver plating solution to replace the copper plugs with silver.

7. The method of preparing a thin plate of insulating material for an electron target having a multiplicity of apertures therethrough, each aperture having a shape which is substantially the frustum of a cone comprising the steps of coating a plate of insulating material with material which is unaffected by an etching fluid in such a manner that a multiplicity of small spots on the plate are not covered by the coating material, etching said coated plate with an etching solution to etch those portions of the plate not covered by the coating material to a depth which is a fraction of the thickness of the plate and then turning the plate and etching it with the etching solution again in such a manner that a considerable portion of the material is etched from the side of the plate not covered by the coating material.

8. The method of preparing an insulating member used as an electron target for an etching process adapted to form a multiplicity of apertures in said member comprising the steps of placing a metallic grid member adjacent said insulating member, filling the interstices of the grid member with a wax-like substance, removing the grid member and leaving a multiplicity of wax-like islands on said plate, and supporting the insulating member with respect to a source of heat for a period of time sufficient to allow the wax-like islands to melt down to such an extent that only a multiplicity of small spots on the insulating member, each substantially equidistant from four of the islands, are not covered by the wax-like substance.

9. A cathode ray tube camera target comprising a sheet of insulating material, a multiplicity of frusto-conical openings therethrough, at least 4000 per square inch, the cross-sectional area of each opening at one face of said sheet being many times that at the other face, solid metallic conducting material in each opening, said material being of frusto-conical shape and conforming to said opening, and additional means for positively locking said material in said openings consisting of a head at the smaller end of each frusto-conical conducting element, said head having a shoulder all portions of which engage said sheet.

10. A cathode ray tube camera target comprising a sheet of insulating material, a multiplicity of frusto-conical openings therethrough, at least 4,000 per square inch, the cross-sectional area of each opening at one face of said sheet being many times that at the other face, a copper plug in each opening, each of said plugs being of frusto-conical shape and conforming to its respective opening, and additional means for positively locking each plug in its respective opening consisting of a head at the smaller end of each frusto-conical plug, said head having a shoulder all portions of which engage said sheet.

11. A cathode ray tube camera target comprising a sheet of insulating material, a multiplicity of frusto-conical openings therethrough, at least 4,000 per square inch, the cross-sectional area of each opening at one face of said sheet being many times that at the other face, a silver plug in each opening, each of said plugs being of frusto-conical shape and conforming to its respective opening, and additional means for positively locking each plug in its respective opening consisting of a head at the smaller end of each frusto-conical plug having a shoulder all portions of which engage said sheet.

12. A target for electrons comprising a plate of insulating material having a multiplicity of metallic plugs passing through said plate and locked therein by the shape of the plugs, each of said plugs having a solid frusto-conically shaped portion within said plate and a globular head on the smaller end of said frusto-conical portion.

13. A target for electrons comprising a plate of insulating material having a multiplicity of copper plugs passing through said plate and locked therein by the shape of the plugs, each of said plugs having a solid substantially frusto-conically shaped portion within said plate and a globular head on the smaller end of said frusto-conical portion.

14. A target for electrons comprising a plate of insulating material having a multiplicity of silver plugs passing through said plate and locked therein by the shape of the plugs, each of said plugs having a solid substantially frusto-conically shaped portion within said plate and a globular head on the smaller end of said frusto-conical portion.

15. A target for electrons comprising a plate of glass having a multiplicity of metallic plugs passing through said plate and locked therein by the shape of the plugs, each of said plugs having a solid substantially frusto-conically shaped portion within said plate and a globular head on the smaller end of said frusto-conical portion.

16. A target for electrons comprising a plate of insulating material having a multiplicity of metallic plugs passing through said plate and locked therein by the shape of the plugs, each of said plugs having a solid frusto-conically shaped portion within said plate and a globular head on the smaller end of said frusto-conical portion, each of said plugs having its smallest cross-section substantially at the surface of said plate near its globular head and said plugs being so spaced that said target has more than four thousand plugs per square inch.

BENJAMIN A. DIGGORY.
GORDON K. TEAL.